E. S. GRAUEL.
Door-Check.
No. 168,151. Patented Sept. 28, 1875.
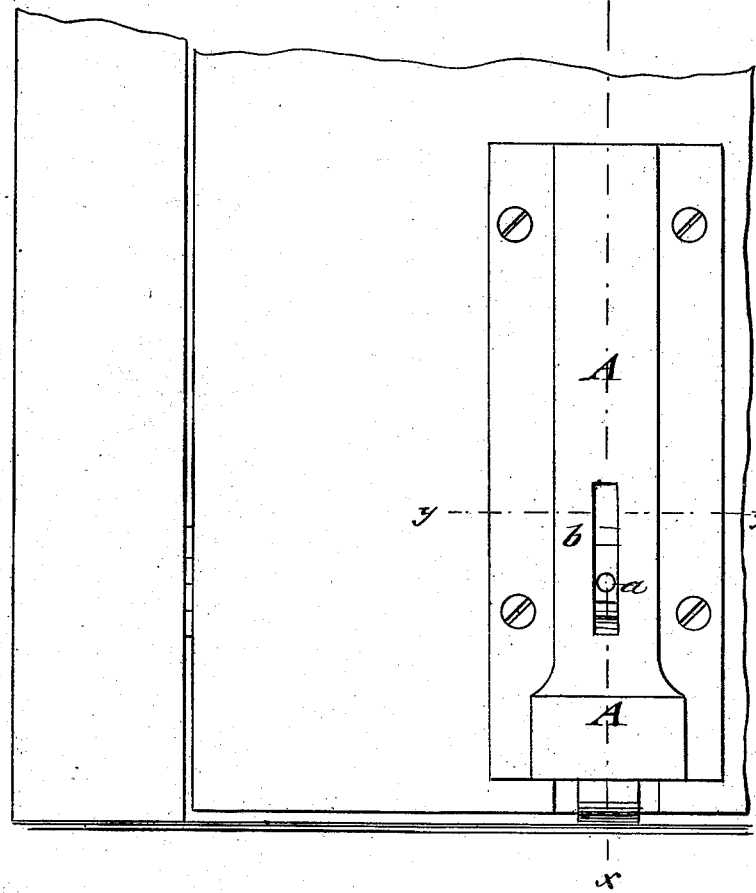
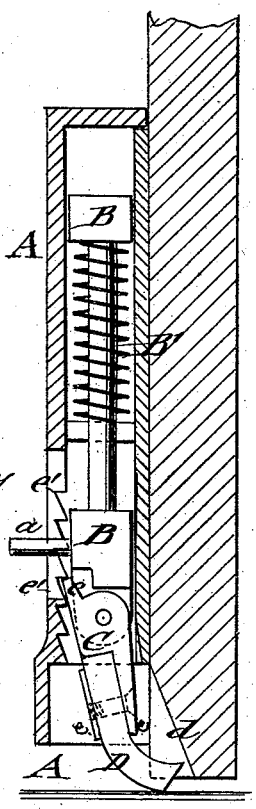
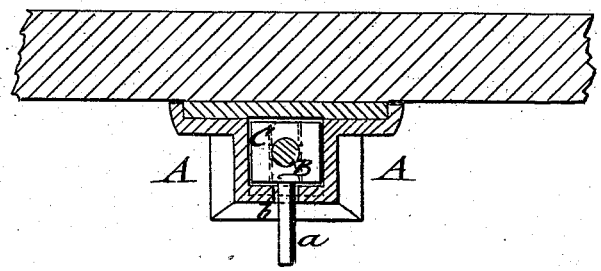
WITNESSES:
E. Wolff
A. F. Terry
INVENTOR:
E. S. Grauel
BY
ATTORNEYS.

UNITED STATES PATENT OFFICE.

EDWIN S. GRAUEL, OF DAYTON, OHIO.

IMPROVEMENT IN DOOR-CHECKS.

Specification forming part of Letters Patent No. 168,151, dated September 28, 1875; application filed September 11, 1875.

*To all whom it may concern:*

Be it known that I, EDWIN S. GRAUEL, of Dayton, in the county of Montgomery and State of Ohio, have invented a new and Improved Door-Check, of which the following is a specification:

In the accompanying drawing, Figure 1 represents a front view of my improved door-check; and Figs. 2 and 3, respectively, vertical transverse and horizontal sections of the same on the line $x\,x$ and $y\,y$, Fig. 1.

Similar letters of reference indicate corresponding parts.

My invention relates to a device for holding the door open at any desired point; and it consists of a sliding spring-acted plunger, with hinged head-piece and rubber extension, that is thrown by a projecting pin into contact with the floor, and retained by the ends of the head-piece locking into ratchet-teeth of the casing, the rubber being drawn back into the casing on closing the door.

In the drawing, A represents a socket or casing, in which the spring-acted plunger B is guided, while a spiral spring, B', between a top shoulder of the plunger and a projection of the casing tends to force the plunger in upward direction. A head-piece, C, is hinged to the lower end of the plunger, and a rubber extension, D, attached thereto. A pin, $a$, of the plunger extends through a slot, $b$, of the casing to the outside of the same, and serves to force the plunger down when the door is pushed back, so that the rubber comes in contact with the floor and turns toward the door, which is provided, as well as the casing, with a recess, $d$, to give play to the rubber. The friction of the rubber on the floor retains the same firmly at any desired point, while end projections $e$ of the hinged head-piece C lock into ratchet-teeth $e'$ at the interior of the casing, at one or both sides of slot $b$, and secure rigidly the position of the rubber block. When the door is moved in opposite direction the rubber is turned back, and throws the projections or ends of the head-piece out of the ratchet, so that the spring can move the plunger in upward direction, raising the rubber clear of the floor, and allowing the unobstructed closing of the door.

Having thus described my invention, I claim as new and desire to secure by Letters Patent—

1. A door-check for holding the door open at any point, composed of a casing with front slot and interior ratchet-teeth, and of a sliding and spring-acted plunger with hinged head-piece, having end projections, and rubber extension-block, for retaining the rubber firmly in contact with the floor, substantially in the manner and for the purpose set forth.

2. The plunger-guiding casing and door, provided with recesses at the lower part for giving play to the curving of the rubber when binding on the floor, substantially as specified.

EDWIN STUART GRAUEL.

Witnesses:
JOHN J. ACKERMAN,
R. BRUNDLETT.